Sept. 8, 1964  H. H. LOCKHART  3,148,343
VARIABLE ULTRASONIC DELAY LINE
Filed May 31, 1961  2 Sheets-Sheet 1

INVENTOR.
HARRY H. LOCKHART
BY
*Philip J. McFarland*
ATTORNEY

Sept. 8, 1964      H. H. LOCKHART      3,148,343
VARIABLE ULTRASONIC DELAY LINE

Filed May 31, 1961      2 Sheets-Sheet 2

INVENTOR.
HARRY H. LOCKHART
BY
ATTORNEY

3,148,343
VARIABLE ULTRASONIC DELAY LINE
Harry H. Lockhart, Natick, Mass., assignor to Laboratory for Electronics, Inc., Boston, Mass., a corporation of Delaware
Filed May 31, 1961, Ser. No. 113,937
2 Claims. (Cl. 333—30)

This invention pertains generally to ultrasonic delay lines and particularly to variable solid ultrasonic delay lines.

Several kinds of variable ultrasonic delay lines are known in the art. Among such devices are the delay line disclosed by Johnson in U.S. Patent #2,659,053, and by Arenberg in U.S. Patent #2,703,867. According to the former reference, two elongated pieces of an acoustic transmitting medium, as quartz, are movably disposed with respect to each other so that the length of the acoustical path from one end of the first medium to the opposite end of the second medium is variable. A transmitting transducer, as a piezo electric crystal, is intimately attached to one end of the first medium and a similar receiving transducer is attached to the opposite end of the second medium. Thus, the length of the path of acoustic energy propagated in a straight line between the two transducers may be varied to effect the desired delay.

According to the disclosure of one embodiment of a delay line in the latter reference, an acoustic transmitting medium, again, for example, quartz, may be accurately shaped to form an isosceles triangle. A transmitting and a receiving transducer, which also may be piezo electric crystals, are slidably mounted facing each other on opposite legs of such a triangle. Consequently, when the triangle is moved in a direction normal to its base, the length of the path of acoustic energy in the acoustic transmitting medium between the transmitting transducer and the receiving transducer may be varied to effect the desired delay.

While variable delay lines of the types just mentioned, and other variable delay lines not mentioned, have proven of value in the art, practical difficulties have, until now, made it relatively expensive satisfactorily to fabricate such variable delay lines. First of all, for example, since it is desirable that the acoustic energy impinge normally upon a receiving transducer, the range of adjustment of delays about a given time delay is, necessarily, rather limited in such devices. Further, since propagation of acoustic energy is in a straight line between the transmitting and receiving transducers, the maximum time delay attainable is determined by considerations such as the maximum useful size of known solid acoustic transmitting media. In addition, since the transducers must be accurately aligned and the reference structures are not adjustable after assembly, care must be taken in manufacture to grind and lap all complementary surfaces to extremely close tolerances.

Therefore it is an object of this invention to provide a solid variable delay line so designed that manufacturing tolerances arising in manufacture may be compensated.

Another object of this invention is to provide a variable ultrasonic delay line having an extremely large range of adjustment in delay times.

Still another object of this invention is to provide a solid ultrasonic delay line having a folded transmission path whereby a lesser amount of acoustic transmitting medium is required to obtain a given time delay than is required with known variable solid delay lines.

These and other objects of the invention are attained generally by providing a wedge, or a truncated wedge, of an acoustic transmitting medium having a first and a second movable acoustic coupler in intimate contact with the tapered side of the wedge, each acoustic coupler supporting, respectively, a transmitting and a receiving transducer at approximately a desired angle with respect to the tapered sides, and means for: (1) adjusting the position of the acoustic couplers with respect to each other so that acoustic energy transmitted from the transmitting transducer may, after multiple reflections in the acoustic transmitting medium, energize the receiving transducer most efficiently; and (2) moving the acoustic couplers together along the tapered sides of the wedge to change the time delay between the time at which the transmitting transducer is energized to produce acoustic energy in the acoustic transmitting medium and the time at which the receiving transducer responds to such energy.

For a more complete understanding of the invention, reference is now made to the preferred embodiments thereof described in detail in connection with the drawings, wherein.

Figure 1:
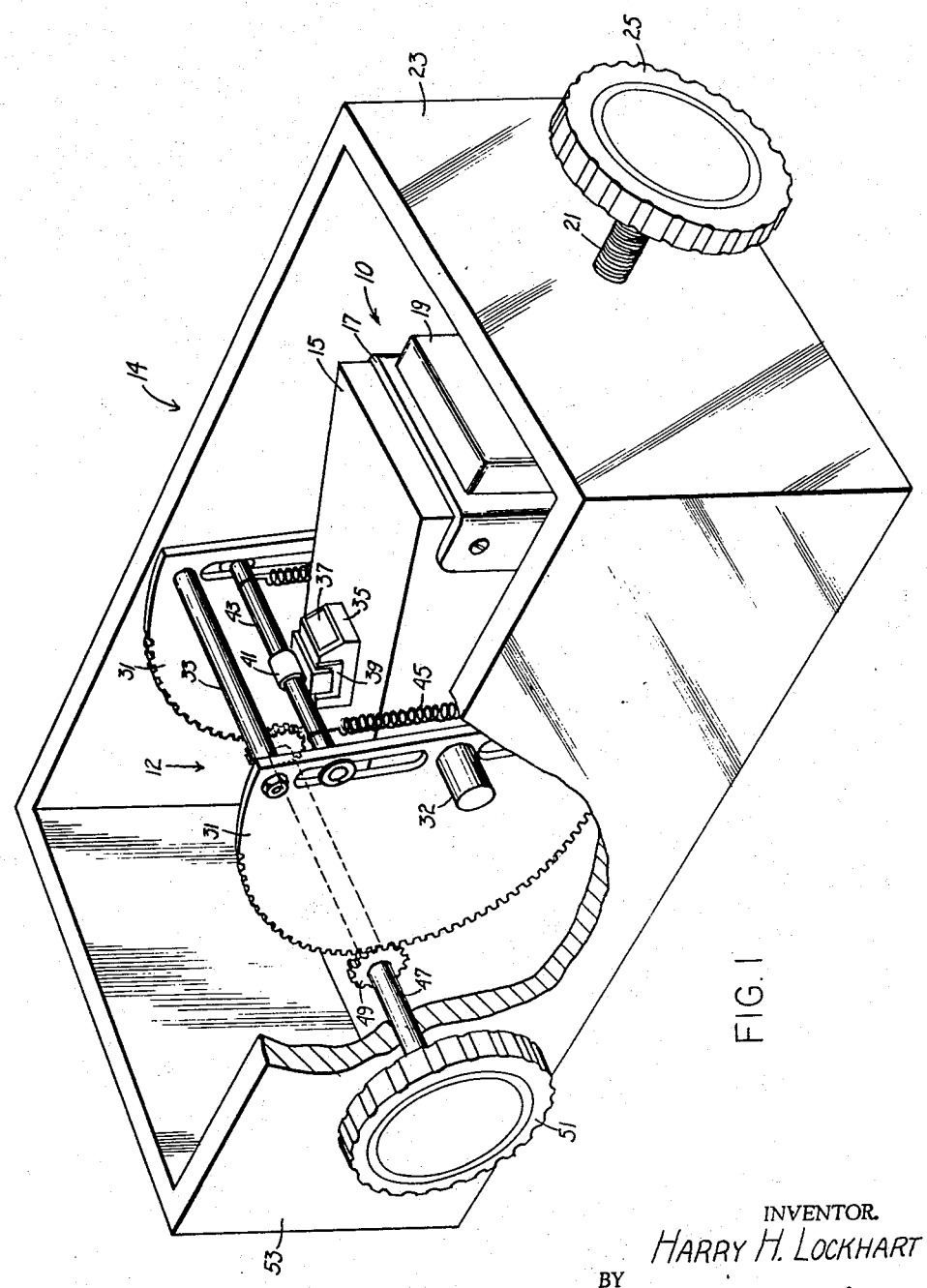
FIG. 1 is an isometric view, partially cut away and simplified, of one preferred assembly of a variable delay line according to the invention.

Before referring to the drawings in detail, it should be noted that common elements necessary to the proper operation of any acoustic delay line have been omitted, for simplicity, from the drawings. For example, the structure required to connect the transducers in circuit in apparatus in which the various delay lines would be used, the lubricant between the acoustic transmitting medium and the acoustic couplers and the normally used energy absorbing surfaces on the various parts of the delay line have been omitted.

Referring now to FIG. 1, it may be seen that a practical embodiment of the invention comprises a delay adjusting assembly 10, acoustic coupler assembly 12, and a cover assembly 14. The delay adjusting assembly 10 preferably is made up of an acoustic transmitting medium 15 shaped to form a wedge, as may be clearly seen in FIG. 3. A yoke 17, affixed in any convenient manner to the acoustic transmitting medium 15 adjacent its base, supports a pad 19 on which a threaded adjusting screw 21 is rotatably mounted. The threaded adjusting screw 21 in turn passes through a threaded opening in an end wall 23 of cover assembly 14 and is attached, in any convenient way, to a delay adjusting knob 25.

The acoustic coupler assembly 12 consists of a pair of sector gears 31 mounted on either side of the acoustic transmitting medium 15 by means of a pair of mounting shafts 32 (only one of which is shown). The sector gears 31 are spaced from each other by means of spacers 33 (only the upper one being shown in FIG. 1) parallel to the mounting shafts 32. The sector gears 31 are thus constrained to rotate in planes which are parallel to the longitudinal axis of the acoustic transmitting medium 15. Each one of a pair of acoustic couplers 35, (again, only one being shown in FIG. 1) supports an acoustic transducer 37 in operative relationship to the acoustic transmitting medium 15. Thus, each of the acoustic couplers is held in contact with a tapered side of the acoustic transmitting medium 15 by structure consisting of a pad 39, a yoke 41 and a shaft 43 urged together by a pair of springs 45 connected between the shafts 43 as shown. To complete the acoustic coupler assembly 12, a shaft 47 is disposed adjacent the sector gears 31 to support gears 49 meshing with the sector gears 31 and to provide a bearing surface for a coupler adjusting knob 51 outside a sidewall 53 of cover assembly 14.

Figure 3:
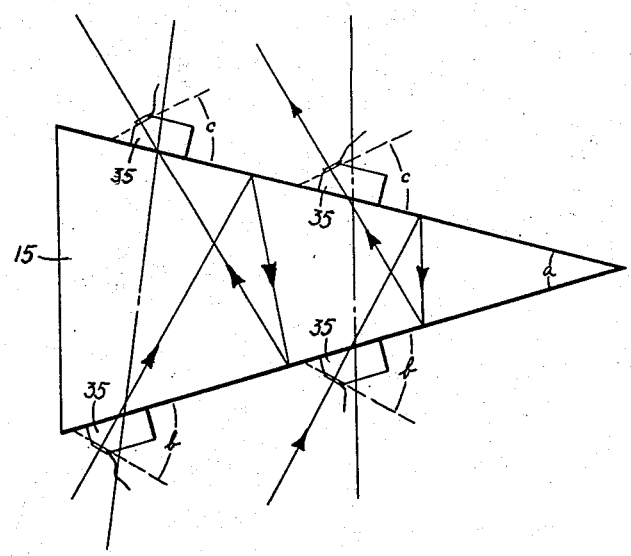

In operation, the acoustic coupler adjusting knob 51 is turned as required finally to adjust the position of each one of the acoustic couplers 35, as is shown more clearly on the left hand side of FIG. 3, until the output of the receiving transducer is a maximum. The time delay of the delay line may then be adjusted by turning the delay adjusting knob 25 to move the acoustic transmitting medium 15 between the two acoustic couplers 35, thus changing the length of the path of the acoustic energy in the acoustic transmitting medium 15 without requiring any change in the relative positions of the two transducers 37.

Figure 2:
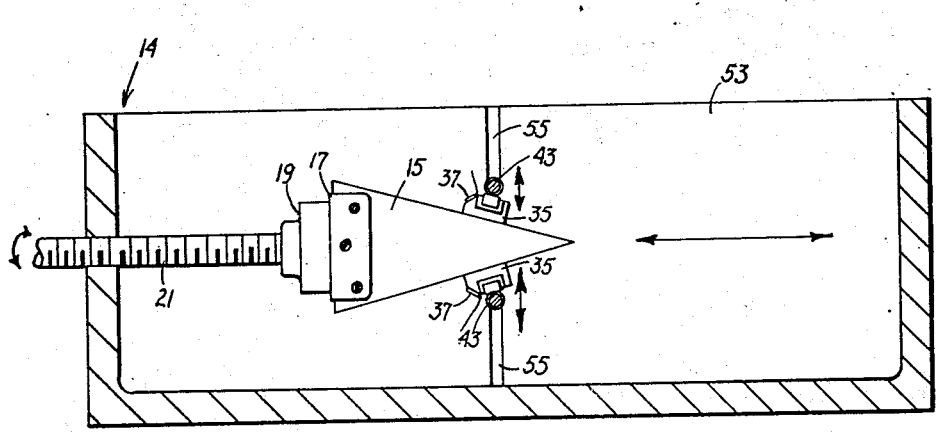
FIG. 2 is a longitudinal cross-section view, greatly simplified, of a delay line according to the second embodiment of the invention; and, FIG. 3 is sketch of the path of acoustic energy in the delay lines shown in FIGS. 1 and 2.

A simpler embodiment of the invention is illustrated in FIG. 2, wherein it may be seen that there is no provision for adjusting the position of acoustic couplers 35 with respect to each other. In FIG. 2 the acoustic transmitting medium 15 is supported within a cover assembly 14 by means of a threaded adjusting screw 21 which is attached to the acoustic transmitting medium 15 by means of a yoke 17 and a pad 19. A pair of acoustic couplers 35 support transducers 37 on opposite side of the acoustic transmitting medium 15. The acoustic couplers 35 are kept in close contact with the tapered surfaces of the acoustic transmitting medium 15 by means of a pair of springs (not shown in this figure but similar to those shown in FIG. 1) connected between a pair of shafts 43 each one of the shafts 43 in turn bearing on a separate one of the acoustic couplers 35 through a pad 39 and a yoke 41. The ends of the shafts 43 are simply retained in slots 55 formed in side walls 53 of the cover assembly 14.

When the threaded adjusting screw 21 is turned it is obvious that the acoustic transmitting medium 15 will be forced to move horizontally as indicated by the horizontal arrow in FIG. 2 and that, simultaneously, the acoustic couplers 35 supporting the transducers 37 will be forced to move vertically as indicated by the vertical arrows in FIG. 2. It is also obvious that the path of the acoustic energy may, for the structure illustrated in FIG. 2, be as shown in the right hand side of FIG. 3.

A moment's reflection will make it clear that the apex angle of the acoustic transmitting medium 15 may be varied within large limits without departing from the concept of the invention. In fact, so long as the apex angle "a" is small enough to allow the use of a folded path for the acoustic energy there is no limit on the apex angle "a." The angle "b" may be similarly varied so long as it is greater than the angle "a" and less than 90°. In the special case where the angle "b" equals an odd half multiple of the angle "a" the path of the acoustic energy in the acoustic transmitting medium 15 is symmetrical about the longitudinal axis thereof and the angle "c" will (when there are two reflections within the acoustic transmitting medium 15) be equal to the angle $b$. In other cases the angle "c" will equal $(na-b)$ where $n$ equals the number of reflections within the acoustic transmitting medium and the acoustic energy impinges normally upon the receiving transducer. Such a general case is shown in the left hand side of FIG. 3.

Several modifications of the invention will now become apparent to those having skill in the art. For example, if it be desired to use one transducer as both a transmitting and a receiving transducer, then the angle "b" may be made to be an integral multiple of the apex angle "a." When the angle "b" is an odd integral multiple of the apex angle "a" the acoustic energy propagated through the acoustic transmitting medium will impinge, normally either directly or after several reflections, on the far wall of the acoustic transmitting medium and be reflected back over its transmission path to the transducer. Similarly, when the angle "b" is an even multiple of the apex angle "a," reflection from the forward path to the return path in the acoustic transmitting medium will occur when the energy impinges normally against the near wall of the acoustic transmitting medium.

In addition, it is not essential to the invention that the cross-section acoustic transmitting medium be formed to the shape of an isosceles triangle. Thus, the cross-sectional shape of the acoustic transmitting medium may be scalene and acute if desired.

In view of the various described preferred embodiments of the invention and the many modifications which will be apparent to those skilled in the art, the scope of the invention should not be limited to the particular described embodiments but rather should be construed in accordance with the appended claims.

What is claimed is:

1. A solid variable ultrasonic delay line comprising a block having opposite tapered sides, the angle between the tapered legs equalling "a," a transmitting transducer and a receiving transducer slidably coupled to opposite ones of the tapered legs of the block, the transmitting transducer being disposed at an angle "b" with respect to the tapered leg adjacent thereto at an angle greater than the angle "a" and less than 90°, the receiving transducer being disposed at angle "c" with respect to the tapered leg adjacent thereto, the angle "c" being less than 90° and equal to $(nb-a)$, where "n" equals the number of reflections, greater than one, of the acoustic energy in the block, means for adjusting the position of the receiving transducer with respect to the transmitting transducer to cause acoustic energy from the transmitting transducer to impinge normally on the receiving transducer, and means for moving the transmitting transducer and the receiving transducer simultaneously along the respective tapered legs to vary the length of the path of the acoustic energy in the block.

2. A solid variable ultrasonic delay line comprising:
   (a) a tapered acoustic transmitting medium;
   (b) a transmitting acoustic coupler and a receiving acoustic coupler slidably disposed, respectively, on opposite ones of the tapered sides of the acoustic transmitting medium;
   (c) a transmitting transducer affixed to the transmitting acoustic coupler and a receiving transducer affixed to the receiving acoustic coupler;
   (d) means for moving the transmitting acoustic coupler and transmitting transducer and the receiving acoustic coupler and receiving transducer with respect to the acoustic transmitting medium to vary the transit time of acoustic waves passing from the transmitting transducer to the receiving transducer in the acoustic transmitting medium, and
   (e) means for adjusting the relative position of the transmitting transducer and the receiving transducer on the acoustic transmitting medium to align the receiving transducer with the beam of acoustic energy, after reflection thereof in the acoustic transmitting medium, from the transmitting transducer, the last-named means including a pair of sector gears, means rotatably mounting the sector gears on opposite sides of the acoustic transmitting medium in planes mutually perpendicular to the tapered sides thereof, a pair of shafts slidably mounted between the pair of sector gears on opposite sides of the acoustic transmitting medium, means for mounting the transmitting transducer and the receiving transducer on separate ones of the shafts in acoustic contact, respectively, with separate ones of the tapered sides of the acoustic transmitting medium, means springily urging the pair of shafts toward each other to maintain such acoustic contact, and means for rotating the pair of sector gears to adjust the position of the transmitting and receiving transducers with respect to the acoustic transmitting medium and to each other.

References Cited in the file of this patent

UNITED STATES PATENTS

| | | |
|---|---|---|
| 2,602,101 | Mesh | July 1, 1952 |
| 2,703,867 | Arenberg | Mar. 8, 1955 |
| 2,867,777 | Robinson | Jan. 6, 1959 |
| 2,927,284 | Worrell et al. | Mar. 1, 1960 |